United States Patent [19]

Nowag

[11] Patent Number: 5,251,492
[45] Date of Patent: Oct. 12, 1993

[54] APPARATUS AND METHOD FOR MEASURING A TENSION FORCE IN A ROPE OR CABLE

[75] Inventor: Alfons Nowag, Bremen, Fed. Rep. of Germany

[73] Assignee: Deutsche Aerospace Airbus GmbH, Hamburg, Fed. Rep. of Germany

[21] Appl. No.: 842,446

[22] Filed: Feb. 27, 1992

[30] Foreign Application Priority Data

Feb. 28, 1991 [DE] Fed. Rep. of Germany ....... 4106266

[51] Int. Cl.$^5$ ................................................ G01L 5/04
[52] U.S. Cl. ........................... 73/862.472; 73/862.391
[58] Field of Search ..................... 73/862.041, 862.07, 73/862.391, 862.42, 862.451, 862.472, 862.44

[56] References Cited

U.S. PATENT DOCUMENTS

| | | | |
|---|---|---|---|
| 2,659,575 | 11/1953 | Seljos | 73/862.42 |
| 2,743,606 | 5/1956 | Webber | 73/862.451 |
| 4,171,640 | 10/1979 | Van Mastrigt | 73/862.451 |
| 4,492,363 | 1/1985 | Niskin | 73/862.451 |
| 4,509,376 | 4/1985 | Thomasson | 73/862.451 |
| 4,587,855 | 5/1986 | Yamada et al. | 73/862.451 |

Primary Examiner—Richard E. Chilcot, Jr.
Assistant Examiner—Ronald L. Biegel
Attorney, Agent, or Firm—W. G. Fasse

[57] ABSTRACT

The force effective in a rope or cable and the stress caused by the force are ascertained by sequentially applying forces (F1, F2) perpendicularly to the rope or cable centrally between two supports. The first force (F1) is applied centrally between two supports contacting the rope or cable at a defined first spacing or distance (g1) from each other to cause a first deflection (h1). The second force (F2) is applied in the same way to cause a second deflection (h2) when the supports have a different spacing or distance (g2) therebetween. The supports during the second force application may be the same as for the first force application, but shifted to a wider spacing or distance (g2). When two pairs of supports are used there is an inner pair of supports between an outer pair of supports and the inner pair can be brought out of contact with the rope or cable when the outer pair is effective during the second force application. The inner supports may, for example, be tilted out of contact with the rope or cable. A different deflection is caused by each force application and the forces, spacings, and deflections are evaluated to calculate the force. With the ascertained force and a known rope or cable cross-sectional area, the stress in the cable can be calculated.

10 Claims, 3 Drawing Sheets

APPARATUS AND METHOD FOR MEASURING A TENSION FORCE IN A ROPE OR CABLE

FIELD OF THE INVENTION

The invention relates to a method and to an apparatus for measuring a tension force in a rope or cable. Once the force has been ascertained, and the cross-sectional area of the rope or cable is known, the tension stress may be calculated. The tension force is ascertained on the basis of forces that are applied perpendicularly to the length of the rope and cable for causing measurable deflections of the rope or cable from a straight line between two supports at which the rope or cable is supported.

BACKGROUND INFORMATION

It is known to measure tension in a rope or cable by means of a tensiometer, which is a device for determining the tensile strength of materials. Cables that must be tested include, for example, those used as a control cable in an aircraft. In a known device of this type the rope or cable is supported or held between two spaced supports. The spacing between the supports is known and the testing force is applied in a direction perpendicularly to a straight line interconnecting the supports, and centrally therebetween. The applied force deflects the rope or cable away from the straight line. Based on this deflection in combination with calibration tables, it is possible to determine the tension in the rope or cable.

The conventional approach as described above is subject to a measuring error because the tension in the rope or cable is increased by the force applied for the measuring and the error depends on the stiffness and length of the rope or cable between the supports. This increase of the tension in the rope or cable by the measuring force, as compared to the tension prior to the application of the measuring force is undesirable, due to said error. Additionally, the evaluation depends on the calibration table provided by the manufacturer, either of the rope or cable or by the aircraft manufacturer or other manufacturer of a device in which a rope or cable needs to be tested. It can happen that the calibration table is not available when needed.

OBJECTS OF THE INVENTION

In view of the foregoing it is the aim of the invention to achieve the following objects singly or in combination:

to avoid the above mentioned error that depends on the rope or cable stiffness and other factors;

to provide a method and apparatus capable of measuring the rope or cable tension independently of measuring errors inherent in a system, whereby the required measurements shall be made quickly and accurately without the need for a calibration table; and to permit the use of simple calculations based on the measurements made for ascertaining the tension in a rope mounted, for example, between a control lever and a controlled member.

SUMMARY OF THE INVENTION

According to the method of the invention two sequentially performed measurements are taken by applying two different forces required to obtain rope or cable deflections of a cable section held between two supports which are spaced from each other at a first distance when the first force is applied and at a second distance when the second force is applied. From the measured forces, the obtained cable deflections, and the known spacings between the supports, the tension force in the rope or cable is ascertained by simple calculations as will be explained in more detail below, whereby errors inherent in the system are avoided.

The apparatus according to the invention is characterized in that at least two effective position shiftable supports, or four supports for the cable are provided. Two supports are sufficient if these two supports can be shifted to change the distance between the two supports. One distance is effective when the first force F1 is applied. Another distance is effective when the second force F2 is applied. In both instances a total of four effective supports are established. The first distance is established between two first supports and the second distance is established either between the same supports shifted into new positions or between two additional supports. A measuring force application member including a load cell is applied perpendicularly to the rope or cable and centrally between the respective supports so that the cable is deflected to a predetermined extent. Since the respective spacings during the measurement are constant and since the deflections are also given and hence known, different forces will be needed for different ropes or cables having different cross-sectional areas, for example, to achieve the prescribed deflections.

By performing the measurement twice as taught by the invention, the present method and apparatus inherently compensate for differences in the characteristics of the rope or cable, especially the length and the stiffness. As a result, exact measurements are obtained and an increase in the rope tension, due to the application of the force for the measurement is compensated or avoided. Hence, it is now possible according to the invention to measure ropes or cables of different length in the control mechanism of an aircraft without the need for specific information regarding the particular construction of the control mechanism being checked. The test can be made substantially faster than was possible heretofore.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
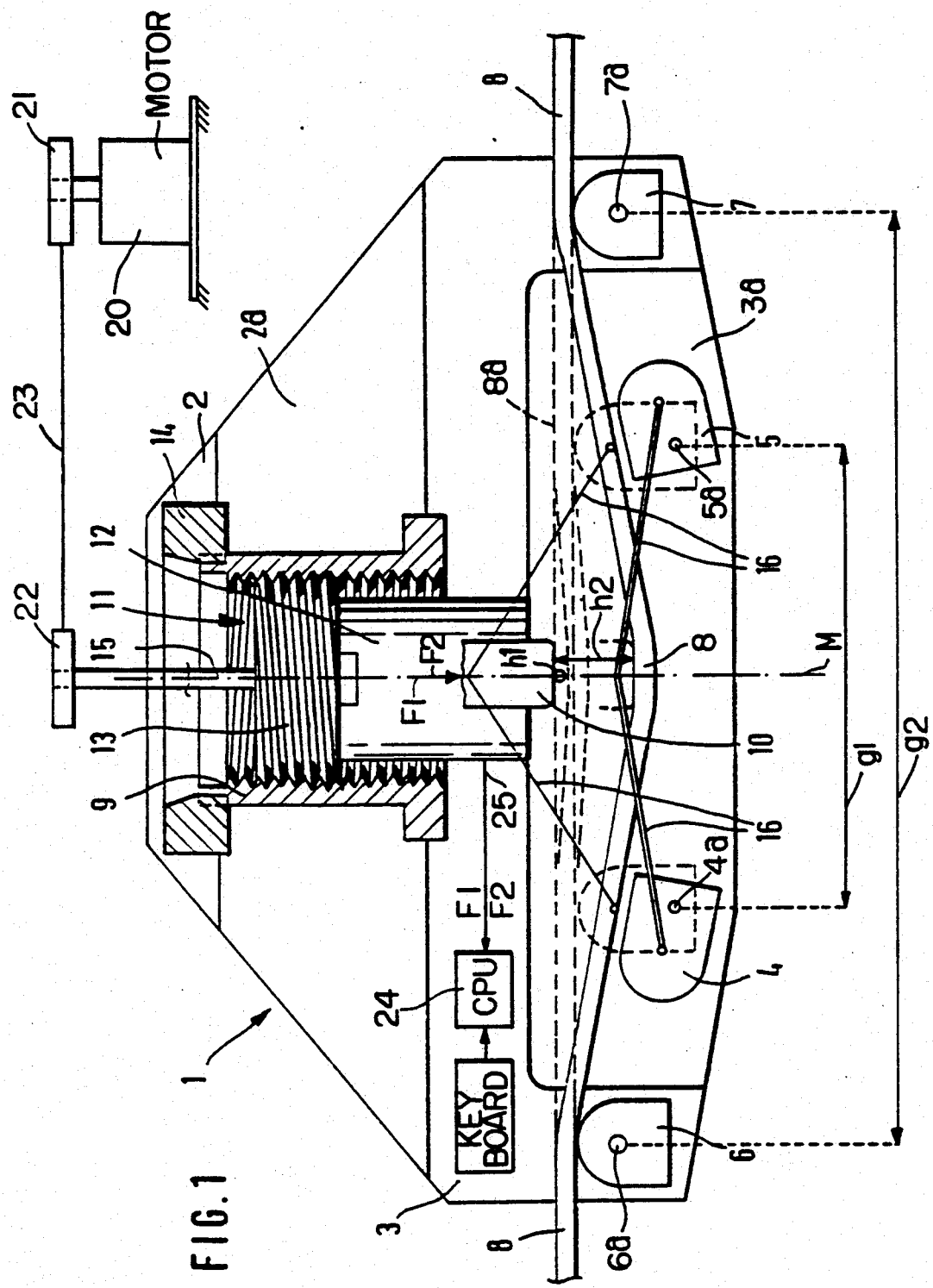
FIG. 1 is a side view, partially in section, of an apparatus according to the invention.

FIG. 1 shows an apparatus according to the invention in which the view direction is in a horizontal plane perpendicularly to the rope or cable 8 referred to as an elastic, elongated member 8. The arrangement includes a housing 1 having an upper section 2 connected through, for example, a number of ribs 2a to a lower section 3 for mounting a force application and sensing device 11 in the housing 1. The force application and sensing device 11 will be described in more detail below. The device compensates the above mentioned error.

The member 8, the tension of which is to be measured, passes through the lower housing section 3. One end of the member 8 is connected, for example, to an operating lever, while the other end is connected to an operated device. The operating lever and the operated device are not shown in FIG. 1. The portion of the member 8 passing through the lower housing section 3 is supported by four supports forming two pairs of supports. The first inner pair includes pivotally mounted supports 4 and 5. The support 4 is pivoted or journalled at 4a to a housing crosswall 3a. The support 5 is pivoted or journalled at 5a to the crosswall 3a. The second outer pair comprises supports 6 and 7. The support 6 is rigidly secured to the lower housing section 3 at 6a. The support 7 is similarly connected to the lower housing section 3 at 7a. The supports 4 and 5, and 6 and 7 respectively, are arranged mirror-symmetrically relative to a central axis or plane M extending perpendicularly to the member 8 in its stretched-out condition. Forces F1 and F2 are applied along axis M perpendicularly to a horizontal tangent to the supports.

The supports 4 and 5 are tiltable in unison about their journal points 4a, 5a by lever links 16 which connect the respective support 4, 5 to a force application bar 10. The lever links or rods 16 are so dimensioned and so pivoted to the bar 10 that the supports 4 and 5 will be tilted out of the position shown in dashed lines and into the position shown in full lines when the bar 10 moves downwardly beyond a point at which a first deflection h1 of the member 8 has been caused, as indicated by dashed lines in FIG. 1. In the dashed line position the supports 4 and 5 support the member 8 until the first deflection h1 is achieved. Thereafter, the supports 4 and 5 are tilted into the full line position as the bar 10 moves further downwardly, whereby the member 8 is held or supported by the supports 6 and 7. The bar 10 moves further downwardly until a second deflection h2 of the member 8 is achieved from the horizontal tangent indicated at 8a.

The first supports 4 and 5 for the member 8 are spaced from each other by a first on-center spacing or distance g1. The second supports 6 and 7 are spaced from each other by a second spacing or distance g2.

The values of g1 and g2 are fixed and given by the dimensions of the apparatus as shown in FIG. 1. Similarly, the deflections h1 and h2 are given. However, the measuring forces F1 and F2 for achieving the respective deflections h1 and h2 will differ, depending on the type of member 8 to be measured.

The forces F1 and F2 indicated by an arrow in FIG. 1 are applied by the force application and sensing device 11 which will now be described. The force application bar 10 is secured through a load cell 12 to a force application spindle 13 driven by a shaft 15 and a motor 20. The power from the motor 20 is transmitted to the shaft 15 through pulleys 21, 22, and a drive belt 23 or the like. As the threaded spindle 13 is rotated in one or the other direction by the shaft 15, it moves up or down respectively in a threaded bushing 9 mounted to the upper section 2 of the housing 1, for example, by a mounting ring 14 securing the bushing 9, e.g. to the ribs 2a.

When the spindle 13 rotates the load cell 12 merely moves up or down, depending on the direction of rotation of the spindle 13. The force application bar 10 moves with the load cell 12 and thereby applies a force F1 or F2 to the member 8 to cause the deflection h1 and h2. The respective forces are transmitted into a central processing unit 24 which also has a keyboard for the entering of the values h1, h2, g1, and g2. Instead, these last mentioned values may also be permanently stored in a memory of the CPU 24. Any necessary power supply is provided in the CPU. The load cell 12 and bar 10 do not rotate with the spindle 13. A conventional bearing permits this.

The apparatus of FIG. 1 operates as follows. First, the drive spindle 13 is moved downwardly by a defined extent h1 to apply the force F1 which is measured by the load cell 12 and supplied to the CPU 24 as indicated by the electrical connection 25. At this time, the two supports 4 and 5 are in the dashed line position shown in FIG. 1. The force application bar 10 moves the member 8 from the horizontal position 8a into the first deflections position represented by the first deflection h1. The applied force F1 counteracts any initial bias in the member 8. Next, the member 8 is relaxed again and the inner pair of supports 4 and 5 is brought from the dashed line position into the full line position as described above. This is accomplished by the linking elements 16.

Next, the driving unit 11 is again activated to move the force application bar 10 with the load cell 12 downwardly by a second deflection h2, whereby the force F2 is applied and measured and also supplied to the CPU 24. The deflection h2 is also a given value and corresponds preferably to several times the first deflection h1.

Since the supporting distances or spacings g1 and g2 and the deflections h1 and h2 are given, and since the forces F1 and F2 are measured, the tension force in the member 8 may be calculated as follows.

$$P = \alpha \cdot F1 + \beta \cdot F2 \quad \text{Equation (1).}$$

The factors $\alpha$ and $\beta$ are determined as follows.

$$\alpha = K1 \left(1 - \frac{D1}{D1 - D2}\right) \quad \text{Equation (2)}$$

$$\beta = K2 \frac{D1}{D1 - D2} \quad \text{Equation (3)}$$

The factors K1 and K2 for calculating $\alpha$ and $\beta$ respectively, are obtained as follows.

$$K1 = \frac{1}{2h^1} \sqrt{h1^2 + g1^2} \quad \text{Equation (4)}$$

$$K2 = \frac{1}{2h^2} \sqrt{h2^2 + g2^2} \quad \text{Equation (5)}$$

The values D1 and D2 for calculating $\alpha$ and $\beta$ respectively are obtained as follows.

$$D1 = \sqrt{h1^2 + g1^2} - g1 \quad \text{Equation (6)}$$

$$D2 = \sqrt{h2^2 + g2^2} - g2. \quad \text{Equation (7)}$$

Since the cross-sectional area A of the member 8 is known, e.g. from a manufacturer's specifications, it is now possible to easily calculate the tension stress S on the basis of the tension force P calculated as above, and divided by the cross-sectional surface area A of member 8, thus $$S = P/A.$$  Equation (8).

Figure 4:
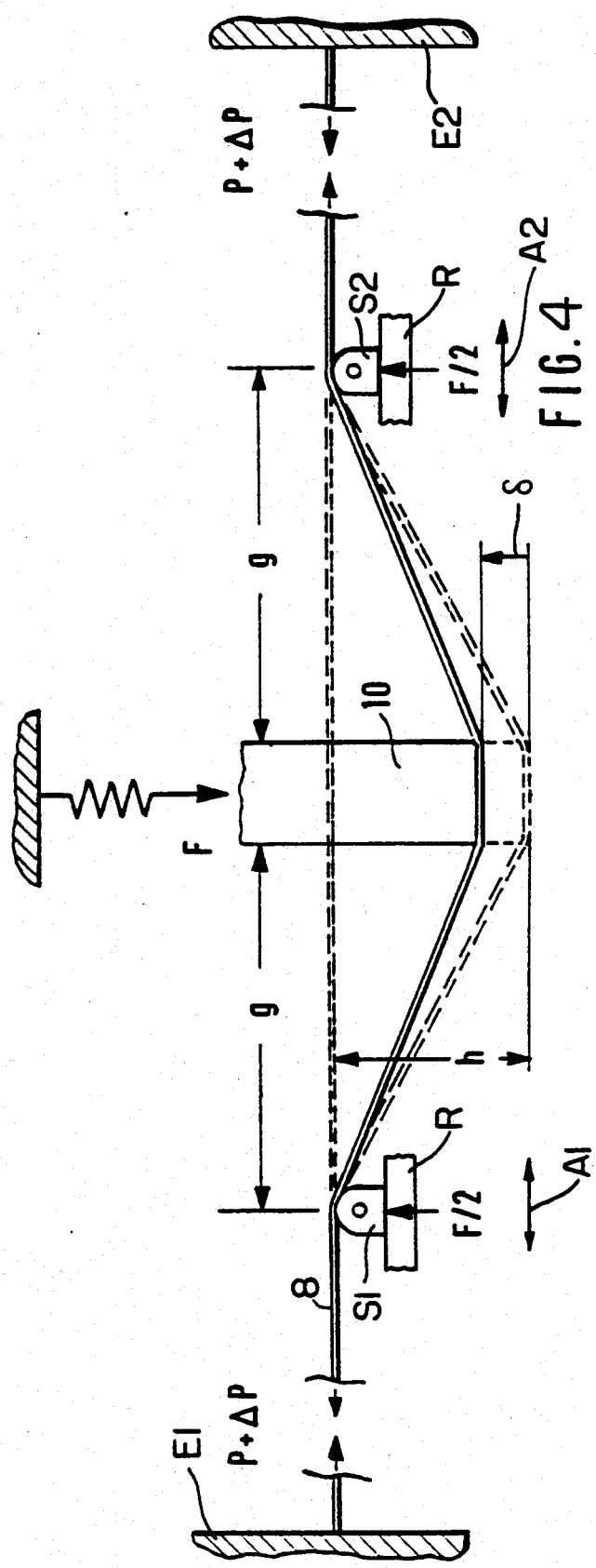
FIG. 4 is a schematic illustration of an arrangement without an inherent compensation of a measuring error caused by the stiffness of the rope or cable or by other factors.

In order to use the just described apparatus in a most versatile manner, for example, for measuring ropes and cables of different lengths and different cross-sectional areas, it is desirable if the spacing g1 and/or the spacing or distance g2 can be varied. In fact, it may be possible to use two supports which are held in the position of supports 4 and 5 for the first force application, and which are then shifted into the position of supports 6 and 7 for the second force application. The arrows A1 and A2 shown in FIG. 4 show this possibility of shifting one set of supports, for example manually along a rail permitting locking the supports in a shifted position.

Generally, it has been found that the most exact measuring results are optimally obtained if the following conditions are met.

(a) The first measurement takes place with a deflection h1 as small as possible and with a spacing g1 as small as possible.

(b) The deflection h2 should be made as large as possible.

(c) The spacing g2 between supports 6 and 7 should be about twice as large as the spacing g1.

(d) If the second force application F2 is applied in gradually increasing steps and the force P is ascertained several times, it is possible to extrapolate from the several measurements to obtain statistically a mean value.

In all embodiments either with one pair of supports that is shiftable between two horizontal positions or with two pairs of supports, one of which is tiltable as shown in FIG. 1, it is preferred that in the measuring position the supports provide a rigid holding of the particular rope section to avoid errors.

Figure 2:
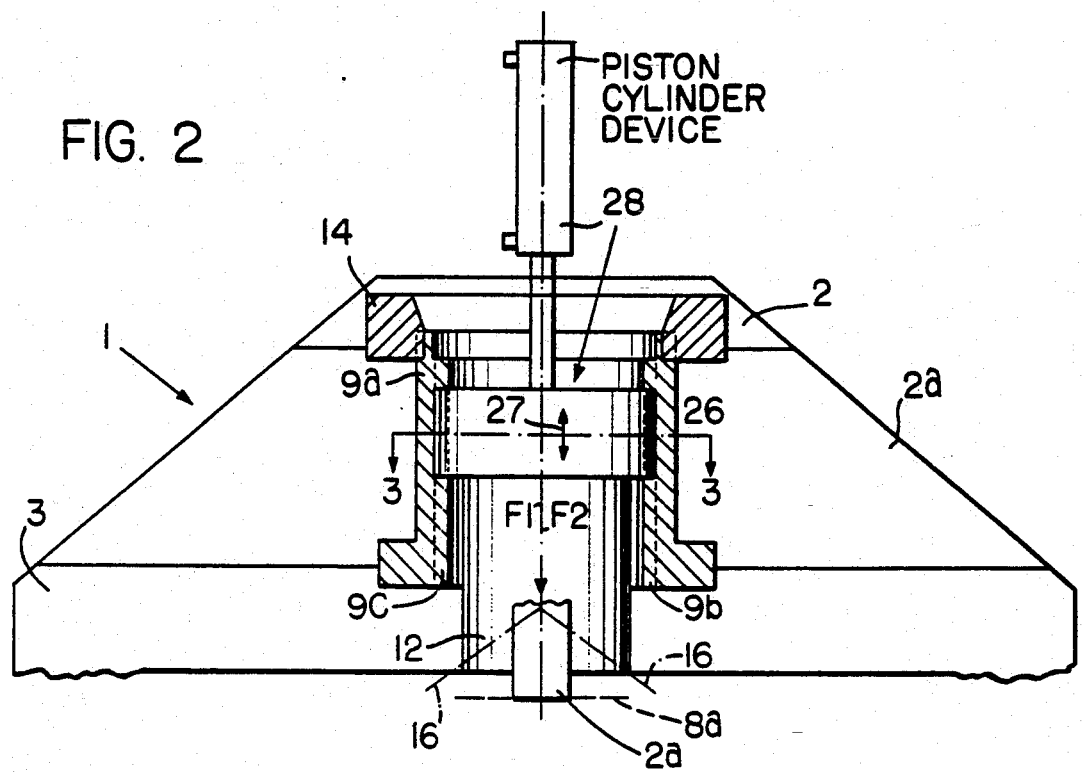
FIG. 2 is a view similar to that of FIG. 1, but showing only the top portion of an apparatus according to the invention modified with regard to the type of force application.
Figure 3:
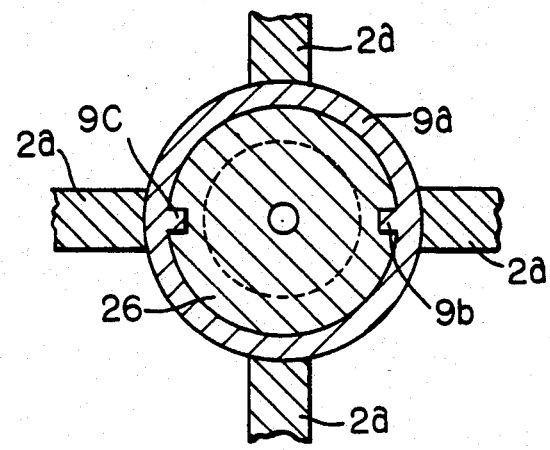
FIG. 3 is a sectional view along section line 3—3 in FIG. 2.

FIG. 2 shows an embodiment in which the same components are provided with the same reference numbers as in FIG. 1. In FIG. 2 the bushing 9 with an internal threading has been replaced by a bushing 9a with two guide rails 9b and 9c, also shown in FIG. 3 for guiding a force application plate 26 up and down as indicated by the arrow 27 inside the bushing 9a. The plate 26 is driven by a piston cylinder device 28. Otherwise, the device of FIG. 2 and FIG. 3 operates in the same way as described above for FIG. 1.

In FIG. 4 the member 8 is held tight at its ends E1 and E2. Supports S1 and S2 are spaced as shown and the force F is introduced centrally and symmetrically between the supports S1 and S2 through the force application bar 10 to provide a deflection H. The supports S1 and S2 are shiftable manually in their horizontal position along a rail R as indicated by the arrows A1 and A2. When the force F is applied, the resulting deflection is diminished by an error which is due to the above mentioned factors. The tension force P in the rope is thus subject to an error force $\Delta P$. This error force depends on the above factors and may be compensated by taking $\delta = F/C$ into account. $\delta$ in turn depends on the force F applied through the applicator 10 and on the spring stiffness C of the member 8. Incidentally, each of the supports S1 and S2 takes up one half of the force F.

Although the invention has been described with reference to specification example embodiments, it will be appreciated, that it is intended to cover all modifications and equivalents within the scope of the appended claims.

What I claim is:

1. An apparatus for ascertaining a tension biasing force in an elongated, tensioned flexible member (8), comprising at least two supports spaced at a first distance value (g1) from each other for supporting said flexible member (8) at two supported locations spaced at said first distance value (g1) from each other for holding said flexible member (8), force applying means including a load cell (12) for applying a first force value (F1) perpendicularly to said tensioned flexible member for deflecting said tensioned flexible member (8) to a first deflection value (h1) while said flexible member (8) is supported at said first distance value (g1), means for spacing said at least two supports from each other at a second distance value (g2) for holding said tensioned flexible member (8) at said second distance value (g2) during application of a second perpendicular force value (F2) by said force applying means for deflecting said flexible member (8) to a second deflection value (h2), while said flexible member (8) is supported at said distance value (g2), said force applying means (10) applying said first and second force values (F1, F2) to said member (8) perpendicularly to said flexible member and centrally between said at least two supports, said load cell (12) being arranged for sensing said forces (F1 and F2), and means for receiving and processing said force values, said deflection values, and said distance values to ascertain said tension force, whereby measuring errors due to said applying of said first and second force values are eliminated.

2. The apparatus of claim 1, comprising two further supports, wherein said first mentioned supports (4, 5) form a first set of two inner supports and said two further supports (6, 7) form a second set of two outer supports, said two first inner supports (4, 5) being located between said two second outer supports (6, 7) along a straight horizontal line formed by said elongated, tensioned flexible member (8) in the absence of said first and second force values which are normally directed vertically and perpendicularly to said straight line and centrally between said first and second supports.

3. The apparatus of claim 2, further comprising means (16) responsive to said force value applying means and connected to said two first supports (4, 5) for bringing said two first supports (4, 5) out of contact with said elongated, flexible member (8) when said second force (F2) is applied to said member (8) while said flexible member (8) is supported by and between said second supports (6, 7).

4. The apparatus of claim 3, wherein said means (16) for bringing said two first supports (4, 5) out of contact with said elongated, flexible member (8), comprise tilting rods pivoted to said two first supports (4, 5) and to said force applying means (10) for tilting said two first supports (4, 5) to a level below a horizontal line defined by said flexible member (8) when said first and second force values are not applied to said flexible member (8), whereby said first supports (4, 5) are out of contact with said flexible member (8) when said second force (F2) is applied to said flexible member.

5. The apparatus of claim 2, wherein said first distance value (g1) between said at least two supports is about one half of said second distance value (g2) between said two further supports.

6. The apparatus of claim 2, further comprising first means (R) for shifting said two further outer supports horizontally along said flexible member (8), and second means (16) for shifting said two inner supports out of contact with said flexible member (8), said two inner supports being located between said two outer supports.

7. The apparatus of claim 2, further comprising means (A1, A2) for horizontally displacing one pair of supports toward and away from a central force application direction (M).

8. A method for ascertaining a tension biasing force in an elongated, flexible member (8), comprising the following steps:
   (a) holding said flexible member (8) between two first supports having a first fixed distance value (g1) from each other,
   (b) applying a first force representing a first force value (F1) to said flexible member (8) perpendicularly to said flexible member (8) and centrally between said first two supports (4, 5) to cause a first deflection value (h1),
   (c) measuring said first force value (F1) and said first deflection value (h1) and recording said first values,
   (d) holding said flexible member (8) between two second supports having a second fixed distance value (g2) from each other,
   (e) applying a second force representing a second force value (F2) to said flexible member (8) perpendicularly to said flexible member (8) and centrally between said two second supports (4, 5), to cause a second deflection value (h2),
   (f) measuring said second force value (F2) and said second deflection value (h2),
   (g) ascertaining said distances (g1, g2), and
   (h) calculating said tension force from said force values, from said deflection values, and from said distances, whereby measuring errors due to said applying of said first and second forces are eliminated.

9. The method of claim 8, further comprising supplying said values to a central processing unit for performing said calculating.

10. The method of claim 8, further comprising ascertaining from said tension force and from a known cross-sectional area of said elongated, flexible member (8) a tension stress in said elongated, flexible member (8).

* * * * *